US005514510A

United States Patent [19]

Hayakawa

[11] Patent Number: 5,514,510

[45] Date of Patent: May 7, 1996

[54] BINDER RESIN FOR ELECTROPHOTOGRAPHIC TONER AND TONER CONTAINING THE SAME

[75] Inventor: Naoki Hayakawa, Kyoto, Japan

[73] Assignee: Sanyo Chemical Industries, Ltd., Kyoto, Japan

[21] Appl. No.: 277,573

[22] Filed: Jul. 20, 1994

[30] Foreign Application Priority Data

Jul. 30, 1993 [JP] Japan .................................... 5-208990

[51] Int. Cl.$^6$ ............................ G03G 9/087; C08L 25/08

[52] U.S. Cl. ............................................ 430/108; 525/191

[58] Field of Search ............................. 430/108; 525/191

[56] References Cited

U.S. PATENT DOCUMENTS

| | | | |
|---|---|---|---|
| 4,499,168 | 2/1985 | Mitsuhashi | 430/109 |
| 4,626,488 | 12/1986 | Inoue | 430/109 |
| 4,966,829 | 10/1990 | Yasuda et al. | 430/109 |
| 5,135,833 | 8/1992 | Matsunaga et al. | 430/110 |
| 5,242,777 | 9/1993 | Kato et al. | 430/109 |
| 5,264,311 | 11/1993 | Nakano et al. | 430/110 |

FOREIGN PATENT DOCUMENTS

| | | |
|---|---|---|
| 0519715 | 12/1992 | European Pat. Off. . |
| 4139193 | 6/1992 | Germany . |
| 4190244 | 7/1992 | Japan . |
| 2251087 | 6/1992 | United Kingdom . |

OTHER PUBLICATIONS

Abstract of JP-4190244, Sanyo Chem Ind Ltd, Binder for Electrophotographic Toner, Jul. 8, 1992.

Abstract of JP-58082258, Canon KK, Dry Processable Toner, May 17, 1983.

Forgo, The Society for Imaging Science and Technology vol. 37, No. 2, "Styrene-Acrylate Copolymers as Toner Resins: Correlations Between Molecular Structure, Viscoelastic Behavior, and Fusing Properties", pp. 176–186, Mar. 1993.

Abstract of JP-1-303447, Inoue, "Toner for Developing Electrostatic Charge Image", Jul. 12, 1989.

Abstract of JP-62-115170, Iwatomo, "Resin Composition for Electrphotographic Toner", May 26, 1987.

*Primary Examiner*—Thomas Hamilton, III
*Attorney, Agent, or Firm*—Wenderoth, Lind & Ponack

[57] ABSTRACT

The present invention is concerning a binder resin for an electrophotographic toner, which comprises a mixture of polymers comprising styrenic monomer units with or without acrylic or methacrylic monomer units. This binder resin has at least one peak in the range of each molecular weight of less than 30,000 and not less than 150,000 in the molecular weight distribution by the GPC analysis. The binder resin of the present invention satisfies sevelal specified inequalities concerning the relations among the molecular weight distribution, the glass transition temperature and the rheological characteristics of said resin. The binder resin of the invention satisfies all properties of the lowest fixing temperature, the lowest temperature when the hot offsett was observed and the running stability, which is important as a properties of the toner, in a higher level than the previous ones.

10 Claims, No Drawings

BINDER RESIN FOR ELECTROPHOTOGRAPHIC TONER AND TONER CONTAINING THE SAME

BACKGROUND OF THE INVENTION

1. Field of the Invention

The present invention relates to a binder resin for an electrophotographic toner and a toner containing the same.

2. Description of the Prior Art

In an electrophotography, the method of applying a heat roller has been widely used to fix an electrostatic latent image visualized with a toner. In applying this method, it is required that the lowest fixing temperature of the toner (Tf; the lowest heat roller temperature when 70% of the fixing strength is obtained) is sufficiently low and the hot offsett temperature (Th; the lowest heat roller temperature when the hot offset is observed) is sufficiently high.

In order to satisfy these two requirements, there have been done many proposals previously on the toner binder resin having a wide range of molecular weight distribution ranging from low molecular weight to high, for example, U.S. Pat. No. 3,941,898. According to these proposals, the molecular weight distribution is spreaded to upperside by using a crosslinking agent or the like.

When the molecular weight distribution is spreaded to upper side by using a crosslinking agent as mentioned in the above, however, there occurs a defect of arising high Tf.

On the other hand, such method may be also available as preparing a high molecular weight portion by a dispersion polymerization, and then mixing and solving it in a solvent with a low molecular weight polymer prepared separately. According to this method, however, when the molecular weight gap of these polymers is large, colorants such as carbon black and additives such as a charge controlling agent cannot be dispersed uniformly, that the charging property in the copy running is unstable, and that the blushing or the scattering of the toner occurs.

It is one of the object of the present invention to obtain, by solving the above-mentioned problems, a binder resin for an electrophotographic toner available for supplying low Tf together with high Th.

Another object of the invention is to obtain a binder resin for an electrophotographic toner providing a toner having a property of dispersing colorants such as carbon black and additives such as a charge controlling agent uniformly in the preparation of the toner, and giving an excellent copy running property. Still another object of the invention is to obtain an electrophotographic toner containing said binder resin.

These and other objects of the invention will become more readily apparent from the description hereinafter.

SUMMARY OF THE INVENTION

Briefly the above-mentioned objects of the present invention have been attained broadly by the description as follows:

<1> A binder resin for an electrophotographic toner, which comprises a mixture of polymers comprising styrenic monomer units with or without acrylic or methacrylic monomer units, said resin having at least one peak in the range of each molecular weight of less than 30,000 and not less than 150,000 in the molecular weight distribution by the GPC analysis, and satisfying the following inequalities (1)–(4):

$$110<54.54+0.64\times10^{-3}\times P_1+0.815\times T_1+0.314\times S_2<123 \quad (1)$$

$$175<5.19+0.0583\times10^{-3}\times P_2+1.227\times T_1+2.45\times S_2<220 \quad (2)$$

$$5.32<2.74+0.2585\times\log P_1+0.0221\times T_1+0.0125\times S_2<5.65 \quad (3)$$

$$55<T_2-T_3<120 \quad (4)$$

wherein $P_1$: the highest peak molecular weight in the range of the molecular weight of less than 30,000 in the said molecular weight distribution;

$P_2$: the highest peak molecular weight in the range of the molecular weight of not less than 150,000 in said molecular weight distribution;

$S_2$: percentage of the area of the range of the molecular weight of not less than 30,000 to the whole area of said molecular weight distribution;

$T_1$: the glass transition temperature (Tg, °C.) of said resin;

$T_2$: the temperature (°C.) providing the storage modulus (G') of 100,000 dyne/cm$^2$, in measuring the dynamic viscoelasticity of said resin under the condition of 20 Hz of frequency and in the melted situation at not less than 100° C.; and $T_3$: the temperature (°C.) providing the absolute value of the complex viscoelastic coefficient ($|\eta^*|$) of 10,000 poise, in measuring the dynamic viscoelasticity of said resin under the condition of 20 Hz of frequency and in the melted situation at not less than 100° C.

<2> An electrophotographic toner which comprises a releasing agent, the binder resin as shown in the column <1> and a colorant.

DETAILED DESCRIPTION OF THE PREFERRED EMBODIMENTS

Said binder resin of the invention is a mixture of at least two kinds of polymers comprising at least one kind of the following (LP) and at least one kind of the following (HP):

(LP) a low molecular weight polymer comprising styrchic monomer units with or without acrylic or methacrylic [hereinafter refered to as (meth)acrylic] monomer units and having a maximum peak in the range of less than 30,000 in the molecular weight distribution by the GPC analysis.

(HP) a high molecular weight polymer comprising styrenic monomer units and (meth)acrylic monomer units and having a maximum peak in the range of not less than 150,000 in the molecular weight distribution by the GPC analysis.

Percentage by weight of (meth)acrylic monomer units in each (LP) and (HP) is preferably as follows:

$0\leqq M_1<30$, more preferably $0\leqq M_1<15$ $20<M_{22}<45$ $M_1$: percentage by weight of (meth)acrylic monomer units in (LP).

$M_{22}$: percentage by weight of (meth)acrylic monomer units in (HP).

When $M_1$ is not less than 30% by weight, the storage stability and the flowability are poor. When $M_{22}$ is not more than 20% by weight, the fixing property and the charging property are poor, and when $M_{22}$ is not less than 45% by weight, the storage stability and the charging property are poor.

Percentage by weight of styrenic monomer units in (LP) is usually 70–100% and in (HP) is usually 55–80%.

Suitable examples of said styrenic monomer include: styrene, alkyl styrenes, such as a α-methylstylene, p-methylstyrene, and the like.

Suitable examples of said (meth)acrylic monomer include: alkyl (meth)acrylates containing 1–18 carbon atoms in an alkyl group, such as methyl (meth)acrylate, ethyl (meth)acrylate, butyl (meth)acrylate, 2-ethylhexyl (meth-)acrylate, lauryl (meth)acrylate, stearyl (meth)acrylate and the like; hydroxyl group-containing (meth)acrylates, for example, hydroxyalkyl (meth)acrylates, such as hydroxyethyl (meth)acrylate and the like; amine group-containing (meth)acrylates, for example, dialkylaminoalkyl (meth-)acrylate, such as dimethylaminoethyl (meth)acrylate, diethylaminoethyl (meth)acrylate and the like; nitrile group-containing (meth)acrylic monomers, such as (meth)acrylonitrile and the like; and (meth)acrylic acid.

Preferable among these are methyl (meth)acrylate, ethyl (meth)acrylate, butyl(meth)acrylate, 2-ethylhexyl (meth-)acrylate, and the combination of at least two of these ones.

If necessary, another copolymerizable monomer, for example, another vinyl monomer, such as a vinyl ester monomer, a vinyl group containing aliphatic hydrocarbon or the like can be used in combination, as units of each LP and HP.

Suitable examples of said vinyl ester include vinyl acetate, vinyl propionate and the like and suitable examples of said vinyl group containing aliphatic hydrocarbon include butadiene and the like.

Percentage by weight of another copolymerizable monomer units in each (LP) and (HP) is preferably less than 20%.

(HP) can be obtained by polymerizing the monomers illustrated in the above in the presence of a poly-functional polymerization initiator having a poly-functional structure.

As for an polymerization method, an optional method can be selected, such as a solution polymerization, a bulk polymerization, a dispersion polymerization, an emulsion polymerization or the like.

Suitable poly-functional polymerization initiators are selected from the group consisting of:

(a) a poly-functional polymerization initiator having at least two peroxide groups within a molecule; and (b) a poly-functional polymerization initiator having at least one peroxide groups and at least one polymerizable unsaturated groups.

Suitable examples of said (a) (a poly-functional polymerization initiator) include 1,1-di-t-butylperoxy-3,3,5-trimethylcyclohexane, 1,3-bis-(t-butylperoxyisopropyl)benzol, 2,5-dimethyl-2,5-di-(t-butylperoxy)hexane, 2,5-dimethyl-2,5-di-(t-butylperoxy)hexyne-3, tris-(t-butylperoxy)triazine, 1,1-di-t-butylperoxycyclohexane, 2,2-di-t-butylperoxybutane, 4,4-di-t-butylperoxyvaleric acid-n-butyl ester, di-t-butylperoxyhexahydroterephthalate, di-t-butylperoxyazelate, di-t-butylperoxytrimethyladipate, 2,2-bis-(4,4-di-t-butylperoxycyclohexyl)propane, 2,2-di-t-butylperoxyoctane and several kinds of polymer peroxides.

Preferable among these are 1,1-di-t-butylperoxy-3,3,5-trimethylcyclohexane, 1,1-di-t-butylperoxycyclohexane, di-t-butylperoxyhexahydroterephthalate, di-t-butylperoxyazelate and 2,2-bis-(4,4-di-t-butylperoxycyclohexyl)propane.

Suitable examples of said (b) (a poly-functional polymerization initiator) include diallylperoxydicarbonate, t-butylperoxymaleic acid, t-butylperoxyallylcarbonate and t-butylperoxyisopropylfumarate. Preferable among them is t-butylperoxyallylcarbonate Suitable examples of the solvent when (HP) is prepared by the solution polymerization include cycloalkane solvents, such as cyclohexane, aromatic solvents such as benzol, toluene, xylene, ethylbenzole, cumene and the like, ester solvents, such as ethyl acetate, butyl acetate and the like, ether solvents, such as methylcellosolve, ethylcellosolve, butylcellosolve, and the like.

In case higher molecular weight is required for HP, preferable among them are cycloalkane solvents and aromatic solvents.

When (HP) is prepared by the dispersion polymerization, the polymerization can be done in an aqueous phase using an inorganic dispersant, such as calcium carbonate, calcium phosphate or the like, or an organic dispersant, such as polyvinylalcohol, methylcellulose or the like.

The polymerization temperature for preparing (HP) is usually 50°–150° C., preferably 60°–120° C. The polymerization process can be preferably done in an atmosphere of such an inert gas as nitrogen.

In the polymerization process for preparing (HP), a poly-functional monomer having at least two polymerizable double bonds can be added within an amount of not forming gell, that is, usually less than 0.1%.

Suitable examples of said poly-functional monomer include di- or polyvinyl compounds, such as divinylbenzol, divinyl toluene, ethyleneglycol diacrylate and 1,6-hexanediol diacrylate, and the like. Preferable among them are divinylbenzol and 1,6-hexanediol diacrylate.

(LP) can be prepared by a solution polymerization. The polymerization can be done by either using monomers alone, or mixing monomers with a polymerization initiator, or adding dropwise monomers and a solution containing a polymerization initiator into a solvent.

Suitable examples of said polymerization initiator in the polymerization process of preparing (LP) include a polymerization initiator of an azo compound, such as azobisisobutyronitrile, azobisvaleronitrile, azobiscyanovaleric acid or the like, a polymerization initiator of an organic peroxide, such as benzoyl peroxide, di-t-butylperoxide, t-butylperoxybenzoate or the like. Preferable among them are azobisisobutyronitrile, di-t-butylperoxide and t-butylperoxybenzoate.

Suitable examples of said solvent in the polymerization process of preparing (LP) include cycloalkane solvents, such as cyclohexane and the like, aromatic solvents, such as benzol, toluene, xylene, ethylbenzol, cumene and the like, ester solvents, such as ethyl acetate, butyl acetate and the like, and ether solvents, such as methylcellosolve, ethylcellosolve, butylcellosolve and the like. Preferable among them are toluene, xylene and ethylbenzole.

The polymerization temperature in the process of preparing (LP) is usually 80°–220° C., preferably 100°–210° C. The polymerization process can be preferably done in an atmosphere of such an inert gas as nitrogen.

The molecular weight and the properties of the polymers obtained according to the present invention can be analyzed and measured by the following methods:

The molecular weight is measured by gel permeation chromatography (hereinafter refered to as GPC) using tetrahydrofurane (hereinafter refered to as THF) as a solvent, and then a calibration curve of the molecular weight is prepared using a standard polystyrene, to calculate the ratio of each area in separating at the molecular weight at the peak, the molecular weight of 30,000 and the molecular weight of 150,000.

The glass transition temperature (hereinafter refered to as Tg, °C.) is measured by observing the crossing point of the base line and the tangent line of the heat absorvent peak obtained by the measurement of DSC.

The dependence of the data of the dynamic viscoelasticity ($\eta^*$, G') on the temperature can be determined by such way as measuring the melt viscoelasticity of the binder at 100°–240° C., as a curve at the temperature of $-\eta^*$, $-G'$ respectively, with such an equipment as RDS-7700II Dynamics Spectrometer, supplied from Rheometrics Inc., U.S.A. The following $T_2$ and $T_3$ can be determined by observing each curve.

$T_2$: the temperature (°C.) providing the storage modulus (G') of 100,000 dyne/cm$^2$, in measuring the dynamic viscoelasticity of said resin under the condition of 20 Hz of frequency and in the melted situation at not less than 100° C.

$T_3$: the temperature (°C.) providing the absolute value of the complex viscoelastic coefficient ($|\eta^*|$) of 10,000 poise, in measuring the dynamic viscoelasticity of said resin under the condition of 20 Hz of frequency and in the melted situation at not less than 100° C.

The binder of the present invention satisfies the following inequalities (1)–(4):

$$110<54.54+0.64\times10^{-3}\times P_1+0.815\times T_1+0.314\times S_2<123 \quad (1)$$

$$175<5.19+0.0583\times10^{-3}\times P_2+1.227\times T_1+2.45\times S_2<220 \quad (2)$$

$$5.32<2.74+0.2585\times\log P_1+0.0221\times T_1+0.0125\times S_2<5.65 \quad (3)$$

$$55<T_2-T_3<120 \quad (4)$$

wherein $P_1$: the highest peak molecular weight in the range of the molecular weight of less than 30,000 in the said molecular weight distribution;

$P_2$: the highest peak molecular weight in the range of the molecular weight of not less than 150,000 in said molecular weight distribution;

$S_2$: percentage of the area of the range of the molecular weight of not less than 30,000 to the whole area of said molecular weight distribution;

$T_1$: the glass transition temperature (Tg, °C.) of said resin. (The definitions of $T_2$ and $T_3$ are mentioned in the above.)

In the inequality (1), when the range is not more than 110, the anti-hot offsett property is insufficient, and when the range is not less than 123, the low temperature fixing property is insufficient. The range is more preferably 113–121.

In the inequality (2), when the range is not more than 175, the anti-hot offset property is insufficient, and when the range is not less than 220, the low temperature fixing property is insufficient. The range is more preferably 185–215.

In the inequality (3), when the number is not more than 5.2, the charging stability cannot be obtained, and when the number is not less than 5.65, the low temperature fixing property is insufficient. The range is more preferably 5.35–6.45.

In the inequality (4), when the range is not more than 55, the width of the fixing temperature is insufficient, and when the range is not less than 120, the charging property of the toner is poor. The range is more preferably 60–110.

The kinds and the ratio of the monomers are selected within the range that the value of $T_1$ is adjusted to be in the range of 55°–70° C.

When $T_1$ is less than 55° C., the storage stability becomes poor, and when $T_1$ is more tan 70° C., Tf go up to high. The binder resin of the present invention satisfying the fixing property of the toner and charging property can be obtained when all of the inequality (1)–(4) are satisfied.

Such binder resin can be obtained by adjusting the range of $T_1$ with the selection of monomers, and also adjusting the range of the following $P_1$, $P_2$ and $P_3$ with a selection of the polymerization condition and the ratio of the component polymers. $T_2$ and $T_3$ can be also adjusted mainly with the polymerization condition and the ratio of the component polymers.

The peak molecular weight of (LP) is usually same as the peak molecular weight of $P_1$ and it is usually in the range of 1000–30,000, preferably 1,000–10,000, more preferably 1,000–5,000.

The peak molecular weight of (HP) is usually same as the peak molecular weight of $P_2$ and it is usually in the range of 100,000–2,000,000, preferably 300,000–1,000,000.

As mentioned in the above, $P_1$ is preferably 1,000–10,000 and $P_2$ is preferably 300,000–1,000,000, and it is more preferable to introduce the following (MP) in order to be satisfied with the inequality (5).

$$5.0<S_{21}<20 \quad (5)$$

$S_{21}$: percentage of the area of the range of the molecular weight of not less than 30,000 to less than 150,000 to the whole area of said molecular weight distribution;

(MP) a polymer comprising styrchic monomer units and (meth)acrylic monomer units and having a maximum peak in the range of the molecular weight of not less than 30,000 to less than 150,000 in the molecular weight distribution by the GPC analysis.

In the inequality (5), $S_{21}$ is more preferably 6.0–12.0. When $S_{21}$ is not more than 5.0, the stability of the charge is insufficient, and when $S_{21}$ is not less than 20, the low temperature fixing property is insufficient.

In preparing (MP), the same monomers can be used as ones used in preparing (HP). In this case, percentage by weight of a (meth)acrylic monomer is 20–45% and percentage by weight of a styrchic monomers is 55–80%.

(MP) can be prepared; either by preparing, in the same manner as (HP), a polymer having a peak in the range of the molecular weight of 30,000–150,000, followed by mixing the same in the mixing process of (HP) and (LP) according to the ratio of satisfying the inequality (5); or by carrying out a radical polymerization with adding monomers and a polymerization initiator dropwise into the mixture of (HP) and (LP) or a bulk polymerization using monomers alone in the presence of the same polymers mixture.

The acid number of (MP) is adjusted to 10–15 by copolymerizing (meth)acrylic acid and/or a half ester of maleic acid, and thereby the charging stability is improved.

The binder of the invention is preferably satisfied with the conditions (9) and (10) as follows:

$$-0.5<SP_1-SP_2<0.8 \quad (9)$$

$$-0.5<SP_1-SP_3<0.8 \quad (10)$$

wherein $SP_1$ is the solubility parameter of (LP), $SP_2$ is the solubility parameter of (MP) and $SP_3$ is the solubility parameter of (HP).

In the inequality (9), $SP_1-SP_2$ is more preferably −0.3–0.6, and in the inequality (10), $SP_1-SP_3$ is more preferably −0.3–0.6.

Each solubility parameter (SP) can be determined by dispensing (co)polymers of each molecular weight range using a GPC for dispensing, followed by calculating according to the formulation of monomers with the method of Fedor etal.

$$SP=(\Sigma\Delta ei/\Sigma\Delta vi)^{1/2}$$

Δei: an evaporation energy of an atom or an atom group.

Δvi: a mole volume of an atom or an atom group.

When the conditions of (9) and (10) are not satisfied, the compatibility among the polymers becomes poor, and therefore, the charging stability cannot be obtained.

In order to be satisfied with the inequalities (9) and (10), the kinds and the ratio of monomers are adjusted. In order to further improve the low temperature fixing property and the anti-hot offsett property, other polymer components can be added within the range of 0–40% by weight to the binder resin of the invention.

The ratio of the components of the electrophotographic toner derived from the binder resin of the invention based on the weight of the toner is, usually 50–95% by weight of the binder resin of the invention, usually 5–10% by weight of a previously known colorant, for example, carbon black, iron black, benzidine yellow, quinacridone, rhodamine B and phthalocyanine, and 0–50% by weight of a magnetic powder, for example, a powder of such aferromagnetic metal as iron, cobalt, nickel or the like, and such a compound of magnetite, hematite, ferrite or the like.

Several kinds of additives can be further added, for example, a charge control agent such as a metal complex, nigrosine or the like, and a lubricant such as polytetrafluoroethylene, a low molecular weight polyolefin, a fatty acid or metal salt or amide thereof or the like. The amount of these additives are usually 0–5% by weight based on the weight of the toner.

The electrophotographic toner can be prepared by blending the components mentioned in the above in a dry atmosphere, followed by kneading under the melted stage, then crushing roughly and finally pulverizing with a jet pulverizer or the like and classifying further to obtain a fine powder with a diameter of 5–20 μm.

Said electrophotographic toner is, if necessary, mixed with a carrier powder, such as iron powder, glass bead, nickel powder or the like, to be used as a developer of an electrophotographic latent image. A fine powder of a water-phobic colloidal silica can be also used for the improvement of the fluidity.

Said electrophotographic toner is used by being fixed on the substrate such as a paper, a polyester film or the like. Illustrative fixing methods include a previously known heat roll fixing method.

Having generally described the invention, a more complete understanding can be obtained by reference to certain specific examples, which are included for purposes of illustration only and not intended to be limiting unless otherwise specified. Hereinafter, part(s) means part(s) by weight.

The condition of measuring the molecular weight with GPC is as follows:

Apparatus: HLC-802A, supplied from Toyosoda, Japan

Column: Two pieces of TSK gel GMH6, supplied from Toyosoda, Japan

Measuring temperature: 25° C.

Sample solution: 0.5% by weight of THF solution

Pouring amount of the solution: 200 μl

Detecting apparatus: The refraction index detector

The molecular weight calibration curve is prepared by using each standard polystyrene having each molecular weight of 8.42 millions, 4.48 millions, 2.89 millions, 355 thousands, 190 thousands, 96.4 thousands, 37.9 thousands, 19.6 thousands, 9.1 thousands, 870 and 500.

The condition of measuring the dynamic viscoelasticity is as follows:

Apparatus: RDS-770011 Dynamics Spectrometer, supplied from Rheometrics Inc., U.S.A.

Test fixture: Cone plate with 25 mmΦ is used.

Measuring temperature: 100°–240° C.

Measuring frequency: 20 Hz (125.6 rad/sec.)

Degree of distortion: Fixed at 5%

Synthesis Example 1

One hundred and fifty parts of xylene was put in a 1 L autoclave after substituted with nitrogen gas, followed by heating with mixing upto 170° C. in the closed system. The mixed solution of 500 parts of styrene. 20 parts of di-t-butylperoxide and 100 parts of xylene were added dropwise for 3 hours to carry out polymerization with controlling the inside temperature of the autoclave at 170° C. Then after maintaining at the same temperature for additional one hour, the polymerization was completed, to obtain a solution (J-1S) containing LP (J-1).

Synthesis Example 2

The polymerization was carried out in the same condition as Synthesis Example 1 except that the amount of di-t-butylperoxide was changed to 30 parts, to obtain a solution (J-2S) containing LP (J-2). A portion of (J-2S) was dried under reduced pressure, to obtain a sample (J-2) for measuring the molecular weight and Tg.

Synthesis Example 3

The polymerization was carried out in the same condition as Synthesis Example 1 except that the amount of di-t-butylperoxide was changed to 10 parts and, a mixed monomers of 420 parts of styrene, 30 parts of n-butyl acrylate and 50 parts of methyl methacrylate were used instead of styrene monomer alone, to obtain a solution (J-3S) containing LP (J-3). A portion of (J-3S) was dried under reduced pressure, to obtain a sample (J-3) for measuring the molecular weight and Tg.

Synthesis Example 4

Six hundreds and fifty parts of styrene, 350 parts of n-butyl methacrylate were put in a 1 L autoclave after substituted with nitrogen gas, followed by heating slowly upto 120° C. with a caution to prevent for overheating, and then bulk polymerization was carried out at the same temperature for 2 hours.

Then the following processes 1)–3) were furthermore carried out in order:

1) Heating upto 140° C. for one hour and bulk polymerization at the same temperature for 4 hours.

2) Heating upto 160° C. for one hour and bulk polymerization at the same temperature for 2 hours.

3) Heating upto 180° C. for one hour and bulk polymerization at the same temperature for 3 hours.

After reducing the pressure inside the reactor and distilling off the residual monomers, the contents were taken out and crushed after cooling, to obtain MP (J-4).

Synthesis Example 5

In the same manner as Synthesis Example 4 except that the monomers used were changed with 350 parts of styrene 135 parts of n-butyl acrylate and 15 parts of methacrylic acid, MP (J-5) was obtained. The acid number of (J-5) was measured and it was 20.5.

Synthesis Example 6

Four hundreds and fifty parts of water and 50 parts of an aqueous solution containing 2% by weight of polyvinyl alcohol (PVA235, supplied from Kuraray, Japan) were put in a 1 L four-necked flask followed by adding a mixed solution of 720 parts of styrene, 280 parts of n-butyl methacrylate and 1.3 parts of 1,1-di-t-butylperoxy-3,3,5-trimethylcyclohexane and then mixing to be a dispersion.

After being substituted with nitrogen gas thoroughly in the flask, the dispersion was heated upto 80° C., to start the polymerization. The polymerization was continued at the same temperature for 20 hours and the conversion was confirmed to come up to 95%, then the contents was heated upto 95° C. and kept at the same temperature for 2 hours, to finish the polymerization.

Filtration, washing and drying were carried out as after-treatments, to obtain HP (J-6).

Synthesis Example 7

Four hundreds and fifty parts of water and 150 parts of an aqueous solution containing 2% by weight of polyvinyl alcohol (PVA235, supplied from Kuraray, Japan) were put in a 1 L four-necked flask, followed by adding a mixed solution of 780 parts of styrene, 200 parts of n-butyl methacrylate, 20 parts of methyl methacrylate and 2 parts of di-t-butylperoxyhexahydroterephthalate and then mixing to be a dispersion.

After being substituted with nitrogen gas thoroughly in the flask, the dispersion was heated upto 90° C., to start the polymerization. The polymerization was continued at the same temperature for 20 hours and the conversion was confirmed to come up to 80%, then the contents was heated upto 95° C. and kept at the same temperature for 2 hours, to finish the polymerization.

Filtration, washing and drying were carried out as after-treatments, to obtain HP (J-7).

Synthesis Example 8

Five hundreds parts of xylene was put in a 2 L four-necked flask, and after being substituted with nitrogen gas thoroughly, it was heated upto its boiling point (about 140° C.) and refluxed. While refluxing it, a mixed solution of 900 parts of styrene, 100 parts of n-butyl methacrylate and 15 parts of t-butylperoxide was added dropwise for 4 hours. The contents was further kept under the refluxing of xylene for 2 hours, thereby the polymerization was finished, to obtain a solution (J-8S) containing LP (J-8). A portion of (J-8S) was dried under reduced pressure, to obtain a sample (J-8) for measuring the molecular weight and Tg.

The results of measuring the molecular weight and Tg of the (co)polymers [(J-1)–(J-8)] were shown in Table 1.

TABLE 1

| Synthesis | Monomer ratio | | | | | PMW × | Mn × | Mw × | Tg | SP | Polymer |
|---|---|---|---|---|---|---|---|---|---|---|---|
| Example | ST | BA | BMA | MMA | AA | $10^3$ | $10^3$ | $10^3$ | °C. | calcd. | obtained |
| 1 | 100 | | | | | 4.0 | 2.3 | 4.8 | 70 | 10.6 | J-1 |
| 2 | 100 | | | | | 3.2 | 2.0 | 3.9 | 64 | 10.6 | J-2 |
| 3 | 84 | 6 | | 10 | | 4.8 | 2.7 | 5.6 | 62 | 10.4 | J-3 |
| 4 | 65 | | 35 | | | 45 | 20 | 87 | 55 | 10.0 | J-4 |
| 5 | 70 | 27 | | | 3 | 42 | 26 | 90 | 59 | 10.5 | J-5 |
| 6 | 72 | 28 | | | | 700 | 350 | 860 | 55 | 10.3 | J-6 |
| 7 | 78 | 20 | | 2 | | 490 | 275 | 575 | 68 | 10.4 | J-7 |
| 8 | 90 | 10 | | | | 12 | 7.2 | 15 | 62 | 10.5 | J-8 |

Example 1–5

Comparative Example 1–3

One hundred parts of MP (J-4) and 250 parts of HP (J-6) were put in 1000 parts of the solution (J-1S) containing (J-1) under stirring and then heated and dissolved while refluxing xylene. The solution obtained was dried at 170° C. under reduced pressure, to obtain the binder resin (R-1) of the invention of Example 1. In the same manner, the binder resins (R-2)–(R-5) of the invention of Example 2–5 and the binder resins (R-6)–(R-8) of Comperative Example 1–3 as shown in Table 2 were obtained. The analytical data of each binder resin and the calculated value of the inequality (1)–(4) according to the analytical data were shown in Table 3.

TABLE 2

| | The ratio of polymers mixed | |
|---|---|---|
| | Binder resin | Polymers used & Percentage |
| Example 1 | R-1 | J-1/J-4/J-6 = 65/10/25 |
| Example 2 | R-2 | J-2/J-4/J-6 = 60/17/13 |
| Example 3 | R-3 | J-3/J-5/J-7 = 63/10/27 |
| Example 4 | R-4 | J-3/J-5/J-6 = 65/7/28 |
| Example 5 | R-5 | J-2/J-5/J-6 = 55/7/38 |
| Comp. Example 1 | R-6 | J-2/J-6 = 70/30 |
| Comp. Example 2 | R-7 | J-8/J-7 = 62/38 |
| Comp. Example 3 | R-8 | J-3/J-7 = 75/25 |

TABLE 3

The analytical data and calculated value of the binder resins

| Binder resin No. | Tg (T1) | Molecular weight at peak $P_1$ | $P_2$ | Percentage of area (GPC) $S_1$ | $S_{21}$ | $S_{22}$ | Calculated value of ineqality (1) | (2) | (3) | (4) |
|---|---|---|---|---|---|---|---|---|---|---|
| R-1 | 65 | 4.0 | 700 | 75 | 7 | 18 | 117.9 | 187 | 5,420 | 71 |
| R-2 | 60 | 3.2 | 700 | 71 | 12 | 17 | 114.6 | 191 | 5,335 | 78 |
| R-3 | 60 | 4.8 | 490 | 73 | 7 | 20 | 118.1 | 198 | 5,480 | 85 |
| R-4 | 65 | 4.8 | 700 | 73 | 6 | 21 | 119.1 | 192 | 5,446 | 71 |
| R-5 | 64 | 3.2 | 490 | 67 | 6 | 27 | 119.1 | 193 | 5,473 | 75 |
| R-6 | 60 | 3.2 | 700 | 76 | 2 | 22 | 113.0 | 178 | 5,272 | 62 |
| R-7 | 64 | 12.0 | 490 | 63 | 7 | 30 | 126.0 | 203 | 6,671 | 80 |
| R-8 | 62 | 4.8 | 490 | 81 | 3 | 16 | 114.1 | 156 | 5,229 | 41 |

$S_1$: percentage of the area of the range of the molecular weight of less than 30,000 to the whole area of the molecular weight distribution of GPC.

$S_{21}$: percentage of the area of the range of the molecular weight of not less than 30,000 to less than 150,000 to the whole area of said distribution of GPC.

$S_{22}$: percentage of the area of the range of the molecular weight of not less than 150,000 to the whole area of said distribution of GPC.

Preparation of Toners

Seven parts of carbon black (MA100, supplied from Mitsubishi Chemical, Japan), 3 parts of a low molecular weight polypropylene (Viscol 550P, Supplied from Sanyo Chemical) and 2 parts of a charge control agent (Spironblack TRH, supplied from Hodogaya Chemical, Japan) were mixed uniformly with 88 parts each of the binder resins (R-1)–(R-5) of the invention or the binder resins (R-6)–(R-8) of Comperative Example 1–3, followed by kneading with a biaxial extruder with a inner temperature of 150° C., crushing each cooled product finely with a jet mill and then classifying with dispersion separator, to obtain the toner (T-1)–(T-8).

Evaluation Examples

Ninetyseven parts of the ferrite carrier (FFV 200/300, supplied from Nihon Seifun, Japan) was mixed uniformly with 3 parts each of the toner (T-1)–(T-8), followed by measuring the lowest fixing temperature measuring the temperature when the hot offsett was observed and evaluating the running stability, using a commercially available copying machine, BD-7720, supplied from Toshiba, Japan). The test results are shown in Table 4.

TABLE 4

Evaluation results of the toners

| Toner | Tf (°C.) *1 | Th (°C.) *2 | Running stability *3 |
|---|---|---|---|
| T-1 | 147 | 225 | ○ |
| T-2 | 143 | 230 | ○ |
| T-3 | 151 | 240 | ○ |
| T-4 | 147 | 230 | ◎ |
| T-5 | 154 | 235 | ◎ |
| T-6 | 145 | 210 | X |
| T-7 | 170 | 230 | ○ |
| T-8 | 145 | 190 | ○ |

TABLE 4-continued

Evaluation results of the toners

| Toner | Tf (°C.) *1 | Th (°C.) *2 | Running stability *3 |
|---|---|---|---|

*1 The heat roll temperature when the fixing ratio (I.D. after abrasion × 100/I.D. before abrasion) exceeds 70%, by abrasing the image having a image density (I.D.) = 0.6, with 5 times of coming and going using a gakushinsiki abrasion durability test (abrasion with paper).
*2 The heat roller temperature of initiating the hot-offsetting (the lowest temperature).
*3 The extent of occurring the scattering of the toner after 30,000 sheets of copying.
◎ extremely small amount of the scattering of the toner
○ small amount of the scattering of the toner
X a lot of the scattering of the toner As shown in Table 4, the toners using the binder resins (R-1)–(R-5) of the invention of Example 1–5 are excellent concerning all properties of the lowest fixing temperature, the anti-hot offsett ability and the running stability.

On the other side, in case of the binder resin (R-6) of Comperative Example 1, it is shown that .the value of the inequality (3) is smaller than the binder resin of the invention and, among the properties of the toner, the running stability is poor.

In case of the binder resin (R-7) of Comperative Example 2, it is shown that the value of the inequality (1) is larger than the binder resin of the invention and, among the properties of the toner, the lowest fixing temperature is high and the low temperature fixing property is insufficient.

In case of the binder resin (R-8) of Comperative Example 3, it is shown that the value of the inequality (2) is smaller than the binder resin of the invention and, among the properties of the toner, the temperature when the hot offsett was observed is low and the anti-hot offsett property is insufficient.

As mentioned in the above, the binder resins of the invention satisfies each property required for the toner in high level and good balance.

The binder resin according to the present invention, having effects as follows, is especially useful for toners in electrophotography.

1. The binder resin of the invention satisfies all properties of the lowest fixing temperature, the lowest temperature when the hot offsett was observed and the running stability, which is important as a properties of the toner, in a higher level than the previous ones.
2. As a result mentioned in the above, the fixing energy of copying can be reduced and the machinery for to prevent hot offsett can be saved, and therefore, the running cost and machine cost of the copying machine, the printer or the like can be saved.

3. By using the binder resin of the invention, a sufficient charging ability can be attained without using a specified measure in preparing the toner.

4. By using the toner derived from the binder resin of the invention, only one kind of the toner can cover a wide range of copying speed, and therefore, the toner cost can be saved, while, in case of traditional ones, many different kinds of toners were required according to the change of the process speed.

What is claimed as new and desired to be secured by Letters Patent is:

1. A binder resin for an electrophotographic toner, which comprises a mixture of polymers comprising styrenic monomer units with or without acrylic or methacrylic monomer units, said resin having at least one peak value of molecular weight in each of the molecular weight ranges of less than 30,000 and not less than 150,000, respectively in a chromatogram as measured by gel permeation chromatography, and satisfying the following inequalities (1)–(4):

$$110<54.54+0.64\times10^{-3}\times P_1+0.815\times T_1+0.314\times S_2<123 \quad (1)$$

$$175<5.19+0.0583\times10^{-3}\times P_2+1.227\times T_1+2.45\times S_2<215 \quad (2)$$

$$5.32<2.74+0.2585\times\log P_1+0.02210\times T_1+0.0125\times S_2<5.65 \quad (3)$$

$$55<T_2-120 \quad (4)$$

wherein $P_1$: the highest peak value of molecular weight in the molecular weight range of less than 30,000 in a chromatogram as measured by gel permeation chromatography;

$P_2$: the highest peak value of molecular weight in the molecular weight range of not less than 150,000 in a chromatogram as measured by gel permeation chromatography;

$S_2$: percentage of the area of the molecular weight range or not less than 30,000 to the whole area of chromatogram as measured by gel permeation chromatography;

$T_1$: the glass transition temperature (Tg, °C.) of said resin;

$T_2$: the temperature (°C.) providing the storage modulus (G') of 100,000 dyne/cm$^2$, in measuring the dynamic viscoelasticity of said resin under the condition of 20 Hz of frequency and in the melted situation at not less than 100° C.; and $T_3$: the temperature (°C.) providing the absolute value of the complex viscoelastic coefficient (1η*1) of 10,000 poise, in measuring the dynamic viscoelasticity of said resin under the condition of 20 Hz of frequency and in the melted situation at not less than 100° C.

2. The binder resin according to claim 1, wherein said styrenic monomer is selected from the group consisting of styrene and an alkyl styrene.

3. The binder resin according to claim 1, wherein said acrylic or methacrylic monomer is selected from the group consisting of an alkyl acrylate or methacrylate having 1–18 carbon atoms in the alkyl group, a hydroxyl group containing acrylate or methacrylate, an amine group containing acrylate or methacrylate, a nitrile group containing acrylic or methacrylic monomer and acrylic or methacrylic acid.

4. The binder resin according to claim 1, comprising a mixture of the following (LP) and (HP):

(LP) a low molecular weight polymer comprising styrenic monomer units with or without acrylic or methacrylic monomer units and having the highest peak in the molecular weight range of less than 30,000 in a chromatogram as measured by gel permeation chromatography;

(HP) a high molecular weight polymer comprising styrenic monomer units and acrylic or methacrylic monomer units and having the highest peak in the molecular weight range of not less than 150,000 in a chromatogram as measured by gel permeation chromatography.

5. The binder resin according to claim 4, wherein said mixture of (LP) and (HP) further contains the following (MP):

(MP) a polymer comprising styrenic monomer units with or without acrylic or methacrylic monomer units and having the highest peak in the molecular weight range of not less than 30,000 to less than 150,000 in a chromatogram as measured by gel permeation chromatography.

6. The binder resin according to claim 5, wherein the highest peak value of molecular weight is 1,000–5,000 in a chromatogram as measured by gel permeation chromatography, and satisfying the following inequalities (5)–(8):

$$5.0<S_{21}<20 \quad (5)$$

$$20<M_{21}<45 \quad (6)$$

$$20<M_{22}<45 \quad (7)$$

$$0\leq M_1<30 \quad (8)$$

wherein, $S_{21}$: percentage of the area of the range of the molecular weight of not less than 30,000 to less than 150,000 to the whole area of a chromatogram as measured by gel permeation chromatography;

$M_1$: percentage by weight of acrylic or methacrylic monomer units in (LP);

$M_{21}$: percentage by weight of acrylic or methacrylic monomer units in (MP); and $M_{22}$: percentage by weight of acrylic or methacrylic monomer units in (HP).

7. The binder resin according to claim 5, wherein percentage by weight of the styrenic monomer units in (LP) is 70–100%, in (MP) is 55–80% and in (HP) is 55–80%.

8. The binder resin according to claim 5, wherein the acid number of (MP) is 10–50.

9. The binder resin according to claim 5, satisfying the following inequalities (9) and (10):

$$-0.5<SP_1-SP_2<0.8 \quad (9)$$

$$-0.5<SP_1-SP_3<0.8 \quad (10)$$

wherein $SP_1$ is the solubility parameter of (LP), $SP_2$ is the solubility parameter of (MP) and $SP_3$ is the solubility parameter of (HP).

10. The binder resin according to claim 1, wherein said resin further satisfies the following inequality:

$$185<5.19+0.0583\times10^{-3}\times P_2+1.227\times T_1+2.45\times S_2<215.$$

* * * * *